United States Patent
Balsiger et al.

(10) Patent No.: US 9,353,804 B2
(45) Date of Patent: May 31, 2016

(54) HARMONIC DRIVE ASSEMBLY WITH SELECTIVE DISCONNECT AND METHOD

(71) Applicant: Hamilton Sundstrand Corporation, Windsor Locks, CT (US)

(72) Inventors: Derick S. Balsiger, Mayer, AZ (US); Keith A. Bloxham, Gilbert, AZ (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 48 days.

(21) Appl. No.: 14/325,918

(22) Filed: Jul. 8, 2014

(65) Prior Publication Data

US 2016/0010701 A1    Jan. 14, 2016

(51) Int. Cl.
| | |
|---|---|
| *F16H 37/04* | (2006.01) |
| *F16D 27/14* | (2006.01) |
| *B64C 13/34* | (2006.01) |
| *B64C 13/42* | (2006.01) |
| *F16H 49/00* | (2006.01) |
| *H02K 7/116* | (2006.01) |

(52) U.S. Cl.
CPC .............. *F16D 27/14* (2013.01); *B64C 13/34* (2013.01); *B64C 13/42* (2013.01); *F16H 49/001* (2013.01); *H02K 7/116* (2013.01)

(58) Field of Classification Search
CPC .................................................. F16H 49/001
USPC ............................................................ 74/640
See application file for complete search history.

(56) References Cited

U.S. PATENT DOCUMENTS

| | | | | |
|---|---|---|---|---|
| 3,214,999 A | * | 11/1965 | Lapp | F16H 49/001 74/640 |
| 4,951,518 A | * | 8/1990 | Hendershot | F16H 35/008 74/395 |
| 6,012,347 A | * | 1/2000 | Hasegawa | B62D 5/0415 180/443 |
| 7,698,968 B2 | * | 4/2010 | Kobayashi | F16H 49/001 74/640 |
| 8,197,554 B2 | * | 6/2012 | Whiteley | H02K 7/116 623/24 |
| 2016/0024858 A1 | * | 1/2016 | Hanton | E21B 23/01 166/377 |

FOREIGN PATENT DOCUMENTS

GB      2500185      * 9/2013

OTHER PUBLICATIONS

U.S. Appl. No. 14/027,788; entitled "Compound Harmonic Drive," filed Sep. 16, 2013; Inventors: Stepan Lunin, Derick S. Balsiger.
U.S. Appl. No. 14/086,001; entitled "Compound Harmonic Drive," filed Nov. 21, 2013; Inventor: Derick S. Balsiger.

* cited by examiner

*Primary Examiner* — Ha D Ho
(74) *Attorney, Agent, or Firm* — Cantor Colburn LLP

(57) ABSTRACT

A harmonic drive assembly with selective disconnect includes a motor with a motor drive shaft, a harmonic drive operatively coupled to the motor drive shaft, and a wave generator operatively coupled to the motor drive shaft and a flex gear of the harmonic drive. Also included is a ring gear of the harmonic drive operatively coupled to the flex gear with a plurality of ring gear teeth configured to mesh with a plurality of flex gear teeth. Further included is an output shaft operatively coupled to the harmonic drive. Yet further included is a retracting mechanism configured to selectively retract the motor drive shaft and the wave generator to decouple the motor drive shaft and the wave generator from the harmonic drive, wherein a clearance between the ring gear teeth and the flex gear teeth is established upon retraction of the motor drive shaft and the wave generator.

12 Claims, 7 Drawing Sheets

HARMONIC DRIVE ASSEMBLY WITH SELECTIVE DISCONNECT AND METHOD

BACKGROUND OF THE INVENTION

The embodiments herein relate to harmonic drives and, more particularly, to a harmonic drive assembly and method for disengaging a harmonic drive.

Aircraft typically include electro-mechanical actuators and other flight control systems that control flight control surfaces on aircraft wing and tail structures. These flight control surfaces are moved and positioned to alter the lift characteristics of the wing and tail structures. For safety, aircraft usually have redundancies in the electro-mechanical actuators and flight control systems that control the flight control surfaces to allow for controlled maneuverability of the aircraft in the event that the primary system malfunctions or fails. When the primary system malfunctions, the backup system takes over and controls the movable flight control surface. The primary system may have become stuck or jammed in one position, making it difficult for the backup system to overcome the primary system and control the flight control surface.

BRIEF DESCRIPTION OF THE INVENTION

According to one embodiment, a harmonic drive assembly with selective disconnect includes a motor with a motor drive shaft. Also included is a harmonic drive operatively coupled to one end of the motor drive shaft. Further included is a wave generator of the harmonic drive operatively coupled to the motor drive shaft and a flex gear of the harmonic drive. Yet further included is a ring gear of the harmonic drive operatively coupled to the flex gear with a plurality of ring gear teeth configured to mesh with a plurality of flex gear teeth. Also included is an output shaft operatively coupled to the harmonic drive. Further included is a retracting mechanism configured to selectively retract the motor drive shaft and the wave generator axially to decouple the motor drive shaft from the harmonic drive and to decouple the wave generator from the flex gear, wherein a clearance between the ring gear teeth and the flex gear teeth is established upon retraction of the motor drive shaft and the wave generator.

According to another embodiment, a method of disconnecting a harmonic drive assembly is provided. The method includes retracting a wave generator of a harmonic drive and a motor drive shaft out of a flex gear of the harmonic drive. The method also includes disengaging a plurality of flex gear teeth of the flex gear from a plurality of ring gear teeth of a ring gear of the harmonic drive, wherein disengaging the flex gear teeth and the ring gear teeth provides a clearance therebetween.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
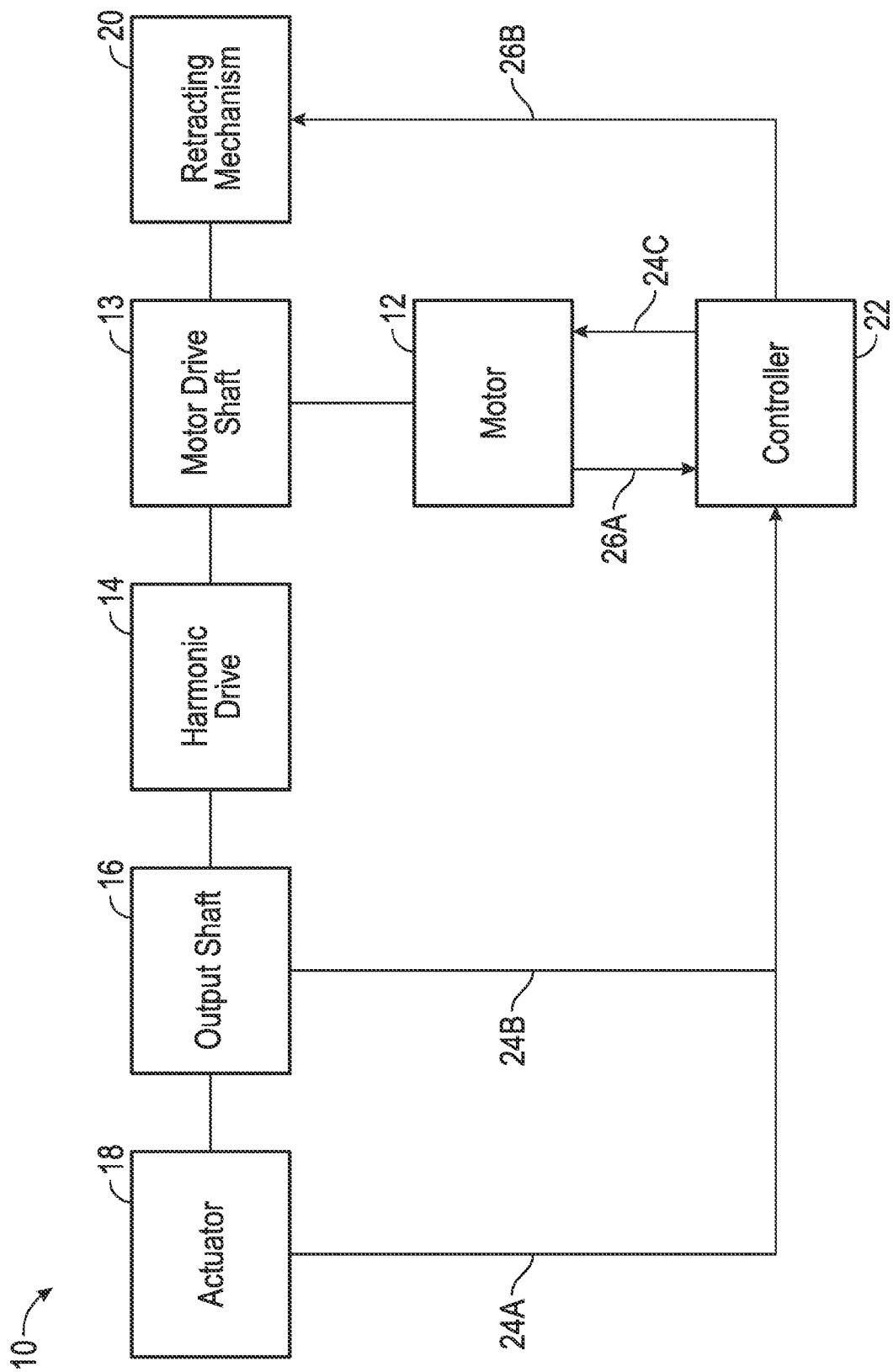
FIG. 1 is a block diagram of a drive assembly with selective disconnect.

Referring to FIG. 1, a block diagram of a drive assembly with selective disconnect is illustrated. Drive assembly with selective disconnect 10 includes motor 12, motor drive shaft 13, harmonic drive 14, output shaft 16, actuator 18, retracting mechanism 20, and controller 22. Controller 22 receives feedback signals 24A-24C and gives instruction or command signals 26A and 26B.

Motor drive shaft 13 is at least partially within motor 12 and receives energy from motor 12. The energy received by motor drive shaft 13 from motor 12 causes motor drive shaft 13 to rotate. One end of motor drive shaft 13, when in an engaged position (as will be discussed below), is engaged/coupled to harmonic drive 14 which, in turn, is connected/coupled to output shaft 16. Output shaft 16 is connected to and drives actuator 18, which can be used for a variety of purposes, including in an aircraft to control a movable flight control surface, such as an aileron or an elevator. The other end of motor drive shaft 13 is adjacent to retracting mechanism 20. Connected to output shaft 16, motor 12, and retracting mechanism 20 is controller 22. Controller 22 receives feedback signals from motor 12, output shaft 16, and actuator 18, and provides instruction or command signals to motor 12 and retracting mechanism 20.

Motor 12 may be an electric motor, hydraulic motor, pneumatic motor, or fuel combustion motor, or other type of motor that is able to receive energy from another source and convert it to mechanical work in the form of rotating motor drive shaft 13. Motor drive shaft 13 may be made from any suitable material, such as steel or another alloy, and is most commonly cylindrical in shape. Motor drive shaft 13 may have a solid core or may be hollow, depending on design considerations and if there is a need to reduce weight. The core of motor drive shaft 13 may also be a different material than the shell. Motor 12 should be configured such that motor drive shaft 13 is accessible from either end so as to allow for one end to be engaged/coupled to harmonic drive 14 while the other end is adjacent to retracting mechanism 20. Motor 12 may contain sensors that monitor motor 12 to detect any malfunctions or failures. The sensors are configured to communicate with controller 22 and inform controller 22 of any malfunctions or failures in motor 12. Motor 12 is configured to rotate motor drive shaft 13, thereby enabling motor drive shaft 13 to perform work.

At one end of motor drive shaft 13 is harmonic drive 14, which is a gear reduction that includes a wave generator, flex gear or flex spline, and a ring gear or ring spline (which will be discussed below in conjunction with FIGS. 2A-2D). The configuration and functionality of a harmonic drive is known in the art, but will be described in greater detail below. Harmonic drive 14 is coupled to motor drive shaft 13 and output shaft 16 and transfers energy between motor drive shaft 13 and output shaft 16.

Output shaft 16 is a drive shaft that receives energy from motor drive shaft 13 through harmonic drive 14. Output shaft 16 may be made from any suitable material, such as steel or another alloy, and is most commonly cylindrical. Output shaft 16 may have a solid core or may be hollow, depending on design considerations and if there is a need to reduce weight. The core of output shaft 16 may also be a different material than the shell.

Output shaft 16 is attached to actuator 18. Actuator 18 may be any electro-mechanical actuator, hinged line actuator, or any other device equipped to receive rotational energy from output shaft 16 and convert it to a useful end, such as moving a flight control surface on an aircraft. Additionally, actuator 18 may be configured to convert rotational motion into linear motion. Actuator 18 as used in an aircraft wing or tail may be a hinged line actuator that works to control a movable control surface, such as an aileron or elevator, for a flight control system.

Retracting mechanism 20 is located opposite harmonic drive 14 at the other end of motor drive shaft 13. FIG. 1 shows retracting mechanism 20 attached to motor drive shaft 13, but retracting mechanism 20 may have other configurations (as will be discussed with regards to FIGS. 2A-2D). Retracting mechanism 20 is configured to retract motor drive shaft 13 when provided instruction or command signal 26B from controller 22. When motor drive shaft 13 is retracted, motor drive shaft 13 disengages and decouples from harmonic drive 14. Once disengaged, energy from motor drive shaft 13 is no longer transferred to output shaft 16. Conversely, output shaft 16 can no longer transfer energy to motor drive shaft 13. Retracting mechanism 20 may also be configured to move motor drive shaft 13 back into its original position so as to engage/couple motor drive shaft 13 to harmonic drive 14 and allow energy to be transferred between motor drive shaft 13 and output shaft 16.

Controller 22 may be electrically connected to every other component in drive assembly with selective disconnect 10 to determine the functionality of the system as a whole and/or each component within drive assembly with selective disconnect 10. In FIG. 1, controller 22 is connected to motor 12, output shaft 16, and actuator 18 to receive feedback signals 24C, 24B, and 24A, respectively, and motor 12 and retracting mechanism 20 to provide instruction or command signals 26A and 26B, respectively. If in an aircraft, controller 22 may also be connected to other components of the aircraft so as to give and receive information regarding aircraft functionality. After receiving feedback signals 24A-24C and determining that drive assembly with selective disconnect 10 is not properly functioning to control actuator 18 or other components, controller 22 will provide instruction or command signal 26A to power off motor 12 as well as instruction or command signal 26B to retracting mechanism 20 to retract motor drive shaft 13, which disengages/decouples motor drive shaft 13 from harmonic drive 14 and prevents energy from being transferred between motor drive shaft 13 and output shaft 16. Feedback signals 24A-24C provided to controller 22 may result in controller 22 instructing motor 12 to power off and retracting mechanism 20 to disengage/decouple motor drive shaft 13. Such a result may be caused by any number of issues, such as a notification that output shaft 16 is not moving or receiving energy from harmonic drive 14 or that actuator 18 is malfunctioning, or that motor 12 is not producing the proper amount of rotational energy based on the energy drawn of motor 12, or that motor drive shaft 13 has failed or malfunctioned.

Upon feedback signals 24A-24C or other inputs into controller 22 that show drive assembly with selective disconnect 10 will function properly once in use again, controller 22 will provide the following instructions or command signals: instruction or command signal 26A to motor 12 to power on and rotate motor drive shaft 13, and instruction or command signal 26B to retracting mechanism 20 to move motor drive shaft 13 into its original position to engaged/couple motor drive shaft 13 to harmonic drive 14. Thereby, configuring drive assembly with selective disconnect 10 to use energy from motor 12 to drive output shaft 16 and actuator 18.

Drive assembly with selective disconnect 10 is advantageous because of the ability to disengage/decouple motor drive shaft 13 from harmonic drive 14, output shaft 16, and actuator 18. It is advantageous to disengage/decouple motor drive shaft 13 from harmonic drive 14 because many machines, such as movable flight control systems in aircrafts, contain redundant systems that take over the duties of actuator 18 in the event of failure to motor 12, motor drive shaft 13, and/or output shaft 16. When failure of the primary system occurs, a backup system takes over and can more easily function to move the control systems and perform the duties of actuator 18 if the backup system does not have to overcome the resistance on output shaft 16 caused by output shaft 16 being coupled to motor drive shaft 13 and motor 12 through harmonic drive 14. Thus, disengaging motor drive shaft 13 from harmonic drive 14 and output shaft 16 prevents wasted energy from transferring from the backup system, through output shaft 16, to motor drive shaft 13 and the other components of drive assembly with selective disconnect 10. If motor drive shaft 13 did not decouple from harmonic drive 14 in the event of failure and when the backup system is functioning, the backup system would have to overcome the resistance of actuator 18, output shaft 16, harmonic drive 14, motor drive shaft 13, and motor 12 to function. Drive assembly with selective disconnect 10, because it disengages/decouples motor drive shaft 13 from harmonic drive 14, allows the backup system to be more efficient and reliable. Additionally, disengaging/decoupling motor drive shaft 13 from harmonic drive 14 prevents the system (output shaft 16 and actuator 18) from becoming jammed in place upon failure or malfunction. Such a jam could result in an inability to control an aircraft in flight if the actuator is used to control a movable flight control surface.

Figure 2A:
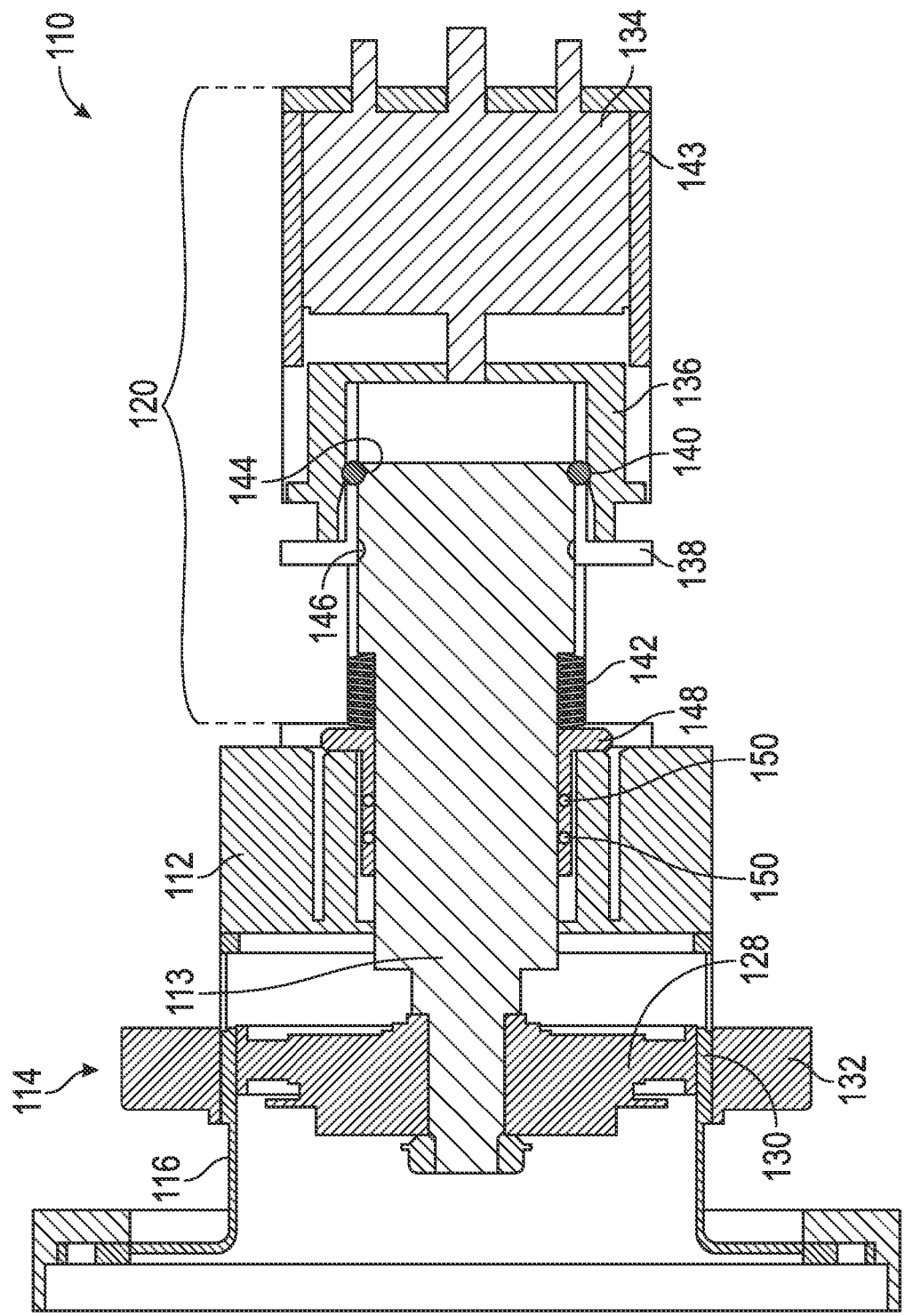
FIG. 2A is a cross-section view of a drive assembly with selective disconnect in an engaged, locked position.
Figure 2B:
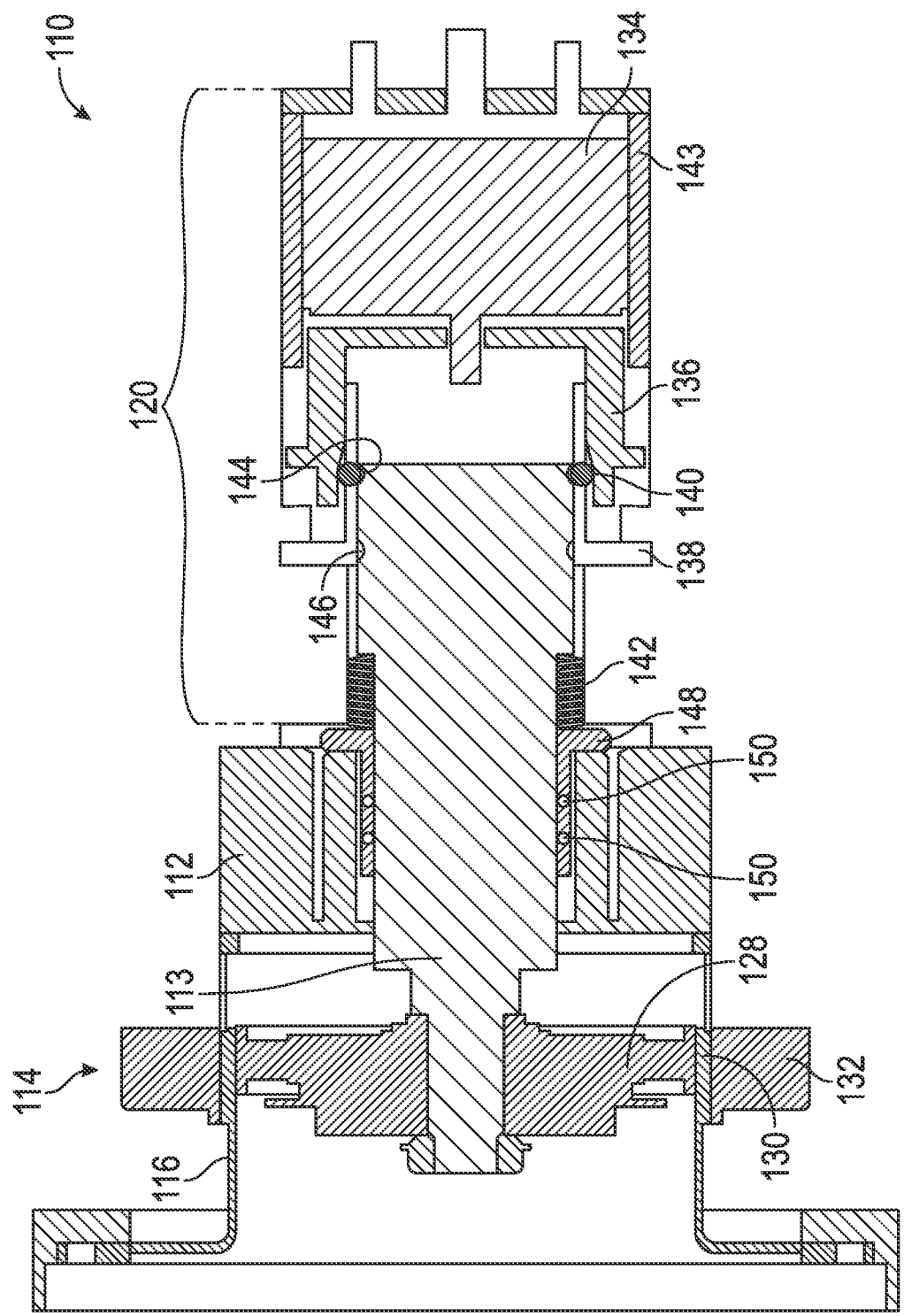
FIG. 2B is a cross-section view of the drive assembly with selective disconnect system of FIG. 2A in an engaged, unlocked position.
Figure 2C:
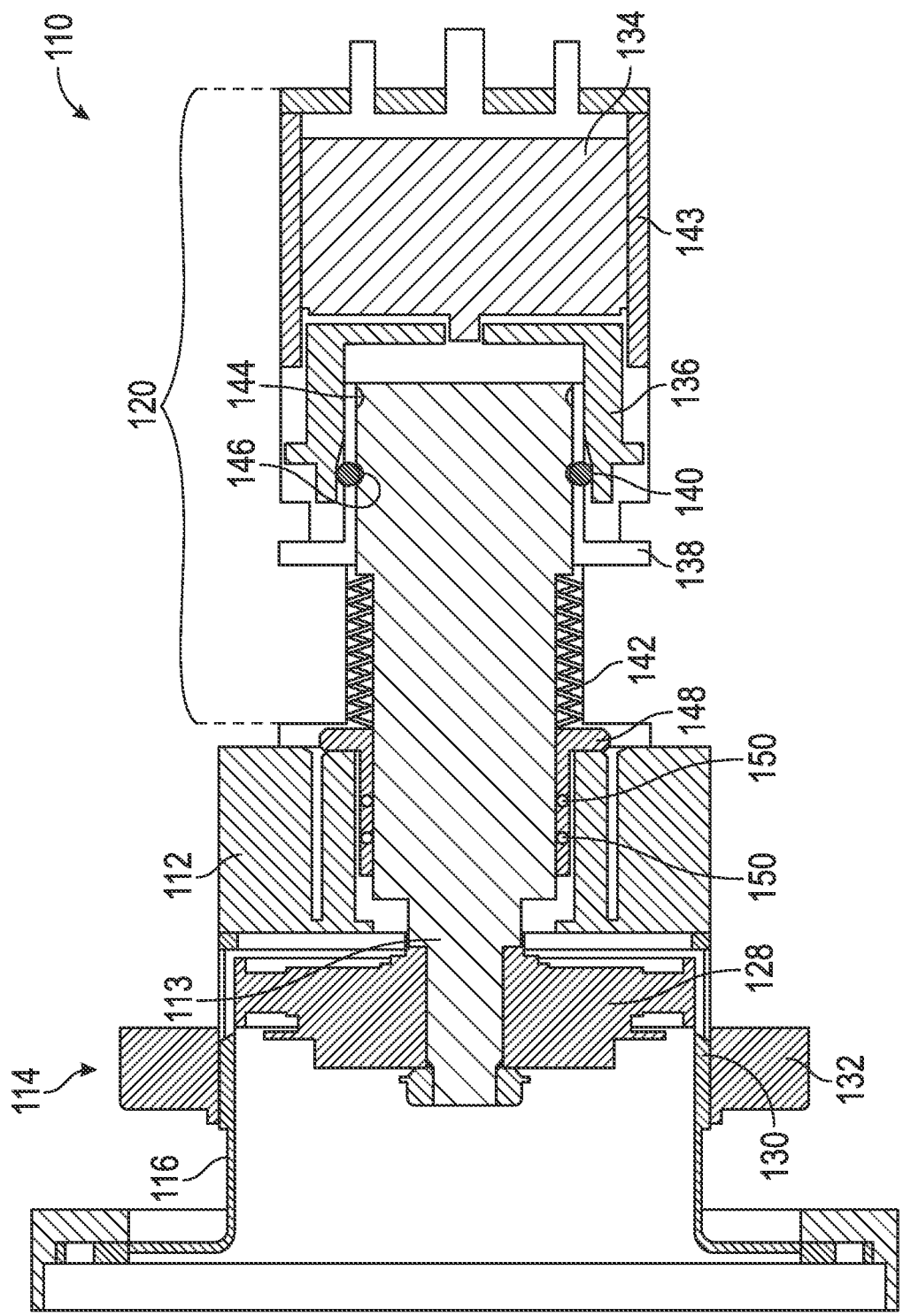
FIG. 2C is a cross-section view of the drive assembly with selective disconnect of FIG. 2A in a disengaged, unlocked position.
Figure 2D:
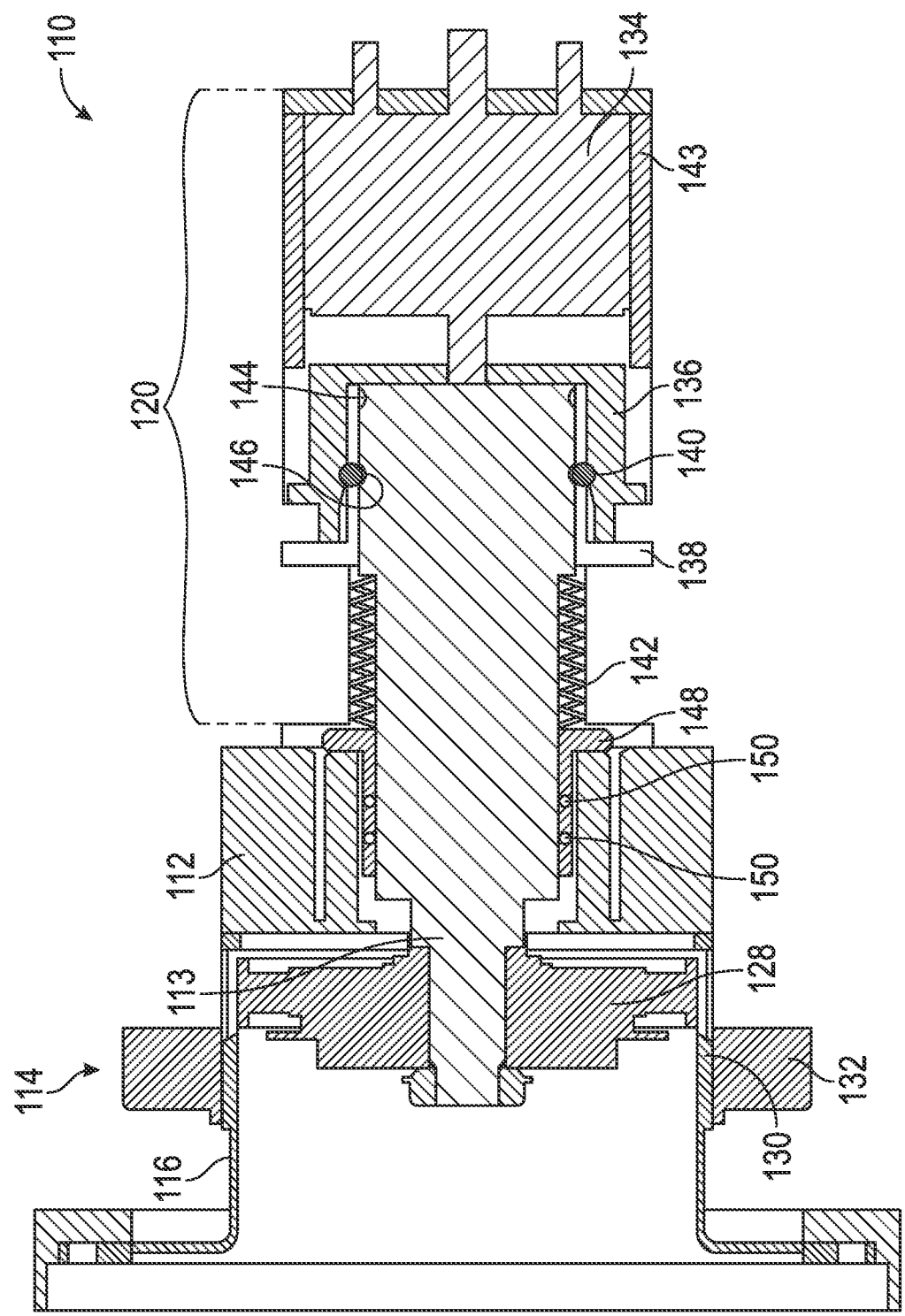
FIG. 2D is a cross-section view of the drive assembly with selective disconnect of FIG. 2A in a disengaged, locked position.

FIGS. 2A, 2B, 2C, and 2D show a drive assembly with selective disconnect in various stages of engagement (coupled) and disengagement (decoupled). FIG. 2A is a cross-section view of the drive assembly with selective disconnect in an engaged, locked position; FIG. 2B is a cross-section view of the drive assembly with selective disconnect in an engaged, unlocked position; FIG. 2C is a cross-section view of the drive assembly with selective disconnect in a disengaged, unlocked position; and FIG. 2D is a cross-section view of the drive assembly with selective disconnect in a disengaged, locked position.

Drive assembly with selective disconnect 110 of FIGS. 2A-2D includes motor 112, motor drive shaft 113, harmonic drive 114, output shaft 116, and retracting mechanism 120. Harmonic drive 114 includes wave generator 128, flex gear 130, and ring gear 132. Retracting mechanism 120 includes solenoid 134, locking mechanism 136, lock ball retainer 138, lock ball bearings 140, spring 142, and reconnect sleeve 143. In motor drive shaft 113, proximate retracting mechanism 120, are engaged groove 144 and disengaged groove 146.

Drive assembly with selective disconnect 110 also includes stroke spline 148 and guide ball bearings 150.

Motor 112 is at least partially radially outward from motor drive shaft 113, which forms the centerline about which motor drive shaft 113, harmonic drive 114, and many other components of drive assembly with selective disconnect 110 are centered. Motor 112 is radially outward from an area near the middle of motor drive shaft 113 and allows motor drive shaft 113 to extend out from both sides of motor 112. Motor 112 may be any motor that provides mechanical energy in the form of rotating motor drive shaft 113, such as an electric motor, a fuel motor, or another type of motor.

Motor drive shaft 113 may be cylindrical and constructed from any suitable material, such as a metal, an alloy, or other material that is able to handle the stresses caused by rotation of motor drive shaft 113 at high speeds. Motor drive shaft 113 should be strong enough in the axial direction to transfer energy from motor 112 to harmonic drive 114 without substantial deformation. Motor drive shaft 113 should also be strong enough to be able to be pulled from one end to move axially without deformation. Additionally, the diameter of motor drive shaft 113 may decrease in a stair-step manner along the axial direction of motor drive shaft 113 the closer motor drive shaft is to harmonic drive 114, which is adjacent to one end of motor drive shaft 113.

Radially between motor 112 and motor drive shaft 113 is stroke spline 148 and guide ball bearings 150, which keep motor drive shaft 113 from radial movement. Stroke spline 148 is annular with a flange extending radially outward at the end furthest from harmonic drive 114 and may be made from a variety of materials, including a metal or alloy. Stroke spline 148 has a plurality of holes aligned axially around the circumference to provide a space for guide ball bearings 150, which sit in the holes and contact motor drive shaft 113 so as to provide a support surface that has a low coefficient of friction. Guide ball bearings 150 are spherical ball bearings that may be made from any material that is sufficiently hard to adequately provide support to motor drive shaft 113 while also having a low coefficient of friction with motor drive shaft 113 and stroke spline 148 to reduce wear and increase efficiency. While FIGS. 2A-2D show two rows of guide ball bearings 150 in stroke spline 148, other embodiments may include a different configuration or may not even include stroke spline 148 or guide ball bearings 150 if such components are not needed to keep motor drive shaft 113 from moving radially.

Harmonic drive 114 is adjacent to one end and radially outward from motor drive shaft 113. Harmonic drive 114 is a harmonic drive or strain wave gearing that is known to one of skill in the art and includes, going from radially inward to radially outward, wave generator 128, flex gear 130, and ring gear 132. Motor drive shaft 113 is connected to wave generator 128 such that if motor drive shaft 113 moves axially, wave generator 128 also moves axially. Wave generator 128 has a cross section that is rectangular with semi-circles on each end. On the radially inner side of wave generator 128 is motor drive shaft 113 and on the radially outer side is flex gear 130. Between wave generator 128 and motor drive shaft 113 may be a lubricant to reduce friction and wear between wave generator 128 and flex gear 130 so as to improve durability and efficiency.

Flex gear 130 has wave generator 128 on the radially inner side and ring gear 132 on the radially outer side. Flex gear 130 may be or have another cross section, but in FIGS. 2A-2D has a cross-section that is substantially oval or elliptical when wave generator 128 is radially within flex gear 130. Flex gear 130 is smooth on the radially inner surface to allow for wave generator 128 to easily slide as wave generator 128 rotates and has teeth on the radially outer surface that, when rotated, fit into teeth on the inner surface of ring gear 132. Flex gear 130 is made from a flexible material, such as spring steel or another suitable material, to allow for flex gear 130 to take a shape similar to an oval when wave generator 128 is radially within flex gear 130. When wave generator 128 is radially within flex gear 130, only the smooth inner surface of flex gear 130 near the semi-circular ends of wave generator 128 contact wave generator 128. As a result, only the teeth of flex gear 130 radially outward from the surface that is in contact with wave generator 128 are in contact with ring gear 132 at any one time, for flex gear 130 takes on a cross section that is substantially oval, while ring gear 132 has a cross section that is circular. As wave generator 128 rotates, wave generator 128 slides within flex gear 130 so that flex gear 130 does not rotate at the same angular velocity as wave generator 128 (thus there is a gear reduction). Generally, while wave generator 128 rotates, flex gear 130 rotates at a slower angular velocity.

Ring gear 132 is annular and has flex gear 130 on the radially inner side. Because ring gear 132 is annular and flex gear 130 has a substantially oval cross-section when wave generator 28 is within flex gear 130, not all of the teeth on the radially inner surface of ring gear 132 contact the teeth on flex gear 130 simultaneously. While FIGS. 2A-2D show flex gear 130 connected to output shaft 116 while ring gear 132 is anchored, either flex gear 130 or ring gear 132 may be connected to output shaft 116 while the other (flex gear 130 or ring gear 132) is anchored in place.

Figure 3A:
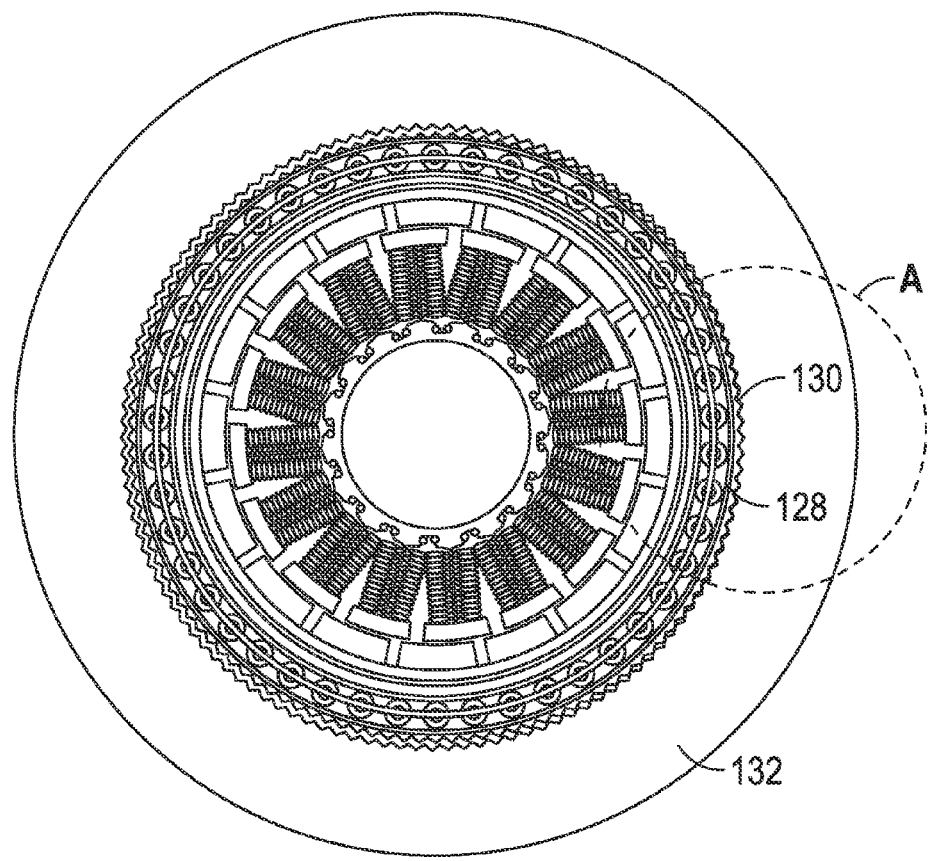
FIG. 3A is an end view of the drive assembly with a wave generator disposed within a flex gear of the drive assembly.
Figure 3B:
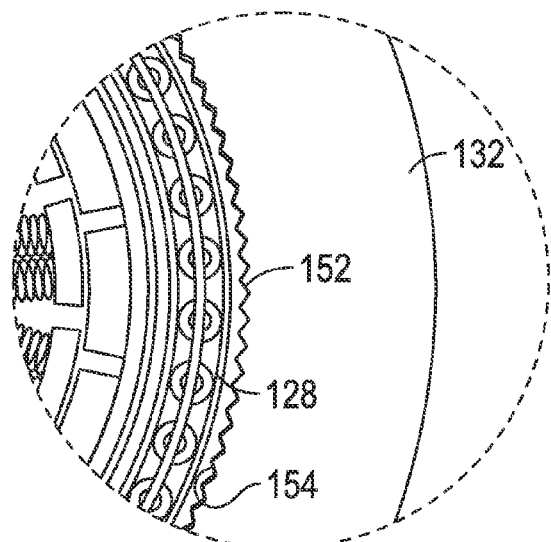
FIG. 3B is an end view of section A of FIG. 3A.

Referring to FIGS. 3A and 3B, the wave generator 128 is shown in an engaged condition, where the flex gear 130 is engaged with the ring gear 132. Specifically, as noted above, the flex gear 130 includes a plurality of flex gear teeth 152 along a radially outer location of the flex gear 130. The ring gear 132 includes a plurality of ring gear teeth 154 along a radially inner location of the ring gear 132. The flex gear teeth 152 and the ring gear teeth 154 are in a meshed, or engaged, condition when the wave generator 128 is in a non-retracted condition and disposed within the flex gear 130.

Figure 4A:
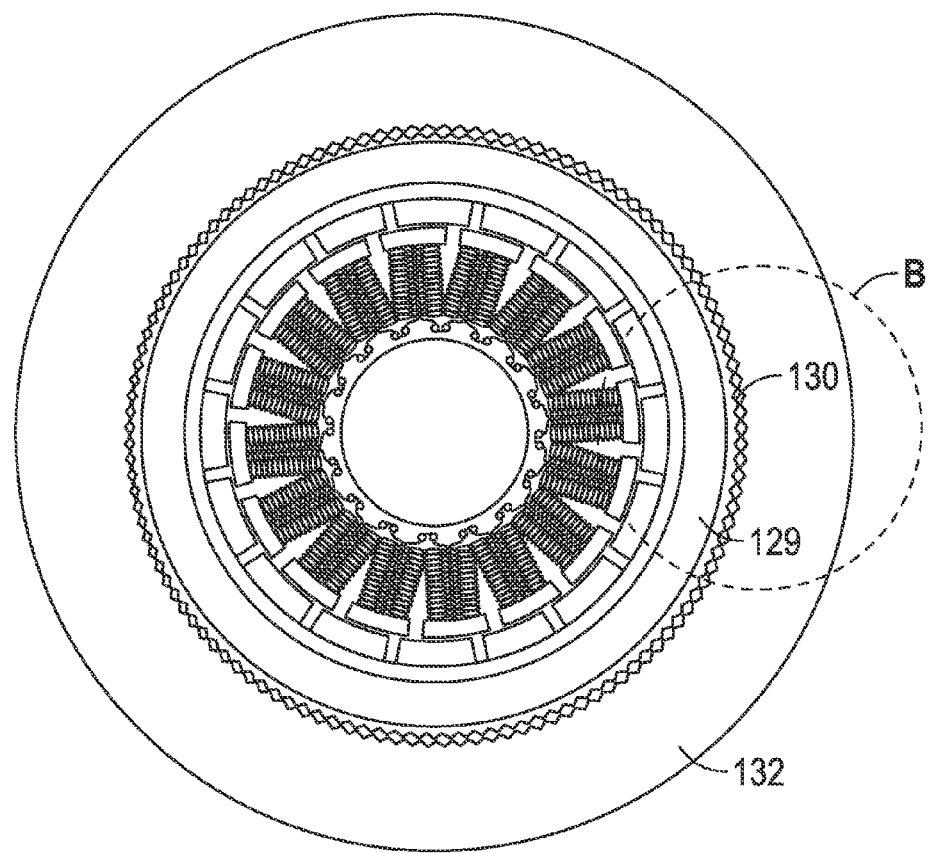
FIG. 4A is an end view of the drive assembly with the wave generator withdrawn from the flex gear in a retracted condition.
Figure 4B:
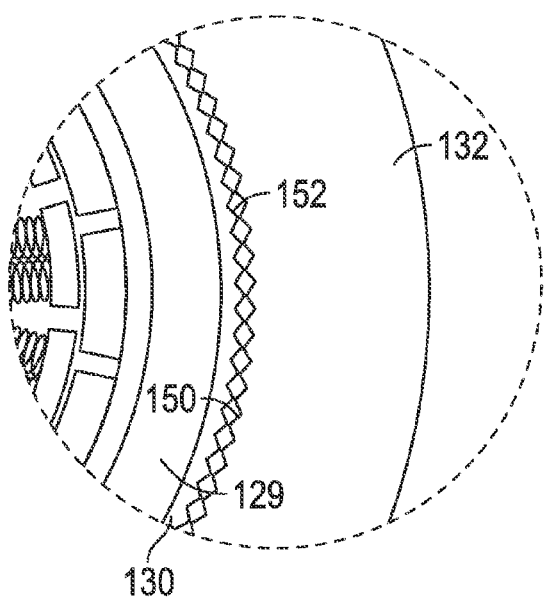
FIG. 4B is an end view of section B of FIG. 4A.

Referring to FIGS. 4A and 4B, the wave generator 128 is shown in a retracted condition, which corresponds to a removed position that disposes the wave generator out of the flex gear 130 (wave generator void referred to with reference numeral 129). In the retracted condition, the flex gear 130 takes on what is referred to herein as a "free state" due to the withdrawal of the wave generator 128. In the free state, the flex gear teeth 152 and the ring gear teeth 154 are completely disengaged from each other to form a clearance therebetween. By establishing a complete clearance between the flex gear teeth 152 and the ring gear teeth 154, it is ensured that ratcheting between the flex gear 130 and the ring gear 132 is avoided. To ensure such a condition, the flex gear teeth 152 and the ring gear teeth 154 are sized to have a specific relationship. In particular, the flex gear teeth 152 have a pitch diameter in the free state that is less than a pitch diameter of the ring gear teeth 154 minus the sum of a flex gear tooth height in the free state and a tooth height of the ring gear. This relationship is defined by the following equation:

$$PD_{FS} < PD_{RG} - (TH_{FS} + TH_{RG})$$

where $PD_{FS}$ is a pitch diameter of the flex gear teeth in the free state; $PD_{RG}$ is the pitch diameter of the ring gear teeth, $TH_{FS}$ is the flex gear tooth height in the free state; and $TH_{RG}$ is the ring gear tooth height.

The use of harmonic drive 114 as a gear reduction is advantageous because it may be desired to disengage/decouple motor drive shaft 113 from harmonic drive 114 and output shaft 116 and later reengage/couple motor drive shaft 113 to harmonic drive 114 and output shaft 116. As will be discussed in greater detail below, to disengage motor drive shaft 113, motor drive shaft 113 and wave generator 128 are removed from harmonic drive 114 (as shown in FIG. 2C) so that wave generator 128 is no longer radially within flex gear 130 and ring gear 132. This prevents the transfer of energy between motor drive shaft 113 and output shaft 116 through harmonic drive 114. Conversely, to reengage motor drive shaft 113, motor drive shaft 113 and wave generator 128 are moved back into harmonic drive 114 so as to position wave generator 128 radially within flex gear 130 and ring gear 132. Because the outer surface of wave generator 128 and the inner surface of flex gear 130 are smooth and without teeth, wave generator 128 and flex gear 130 do not have to be specifically aligned, making the insertion of wave generator 128 into harmonic drive 114 substantially easier than with a conventional gear reduction that has teeth on these two surfaces and requires the teeth to be perfectly aligned. One system used to disengage and reengage motor drive shaft 113 and wave generator 128 with harmonic drive 114 is described below.

As mentioned above, output shaft 116 may be attached at one end to either flex gear 130 or ring gear 132 and extends as a cylinder or another configuration away from harmonic gear 114 in an opposite direction from motor drive shaft 113. The other end of output shaft 116 may be attached to any drive or other device that is equipped to receive energy from output shaft 116 and convert it to a useful end, such as actuator 18 in FIG. 1. Output shaft 116 may be hollow or solid and made from various materials with sufficient properties to be able to receive rotational energy from harmonic drive 114 and convey it to an actuator or another device. The diameter of output shaft 116 is likely larger than that of motor drive shaft 113 due to output shaft 116 being connected to either flex gear 130 or ring gear 132.

Adjacent to the other end of motor drive shaft 113 is retracting mechanism 120. Retracting mechanism 120 include spring 142, which is be radially outward from motor drive shaft 113 and adjacent to stroke spline 148. One end of spring 142 should be attached to motor drive shaft 113 so as to cause motor drive shaft 113 to move axially when possible. The other end of spring 142 should be anchored. Spring 142 may be one helical spring that coils around motor drive shaft 113, a number of helical springs that are arranged circumferentially around motor drive shaft 113, or another device, mechanical or otherwise, that is able to push motor drive shaft 113 away from harmonic drive 114 when allowed or prompted. Spring 142 should be sufficiently strong to move motor drive shaft 113 and wave generator 128 out from harmonic drive 114 and overcome the resistance caused by friction between wave generator 128 and flex gear 130.

Retracting mechanism 120 also includes solenoid 134, which is be located the furthest from motor drive shaft 113 of all the components of retracting mechanism 120. Solenoid 134 is centered axially along the same centerline that motor drive shaft 113 is centered and extends away from the end of motor drive shaft 113 that is opposite harmonic drive 114. Solenoid 134 may be pneumatic, electro-mechanical, or another configuration able to retract and pull on locking mechanism 136 to move locking mechanism 136 away from motor drive shaft 113. While FIGS. 2A-2D show solenoid 134 configured to pull locking mechanism 136 to unlock motor drive shaft 113 and allow spring 142 to remove motor drive shaft 113 and wave generator 128 from harmonic drive 114 (as will be discussed below), solenoid 134 may also be configured to directly retract and remove motor drive shaft 113 and wave generator 128 from harmonic drive 114 and, conversely, to extend and push motor drive shaft 113 and wave generator 128 back into harmonic drive 114.

Between solenoid 134 and motor drive shaft 113 is locking mechanism 136, which is annular with an open end that is radially outward from motor drive shaft 113 and a closed end that is attached to solenoid 134. Locking mechanism 136 may have at least one flange on the outer surface to provide structural support. The inner surface of locking mechanism 136 has a tapered portion where the diameter of locking mechanism 136 increases as it gets closer to the end of locking mechanism 136 that is adjacent to motor drive shaft 113. The inner surface of locking mechanism 136 also has a non-tapered portion with a consistent diameter near the closed end of locking mechanism 136. When solenoid 134 retracts, it pulls on locking mechanism 136, moving locking mechanism 136 away from motor drive shaft 113 and unlocking motor drive shaft 113 (allowing for axial movement of motor drive shaft 113 and wave generator 128). In this embodiment, spring 142 is used to remove motor drive shaft 113 and wave generator 128 from harmonic drive 114 and reconnect sleeve 143 is used to move motor drive shaft 113 and wave generator 128 back into harmonic drive 114, but both of these tasks could be completed by a solenoid or other device.

Radially outward from solenoid 134, locking mechanism 136, and other components of retracting mechanism 120 is reconnect sleeve 143, which may be one or a number of jack screws or another device able to move motor drive shaft 113 and wave generator 128 towards harmonic drive 114 to engage/couple motor drive shaft 113 and wave generator with harmonic drive 114. Other embodiments may not include reconnect sleeve 143 and may include a solenoid (either solenoid 134 or another solenoid) capable of pushing motor drive shaft 113 towards harmonic drive 114.

Radially within locking mechanism 136 at least partially between the annular part of locking mechanism 136 (as opposed to the closed end of locking mechanism 136) and motor drive shaft 113 is lock ball retainer 138. Lock ball retainer 138 is be annular with one end abutting the inner surface of the closed end of locking mechanism 136 and the other end adjacent to motor drive shaft 113. Lock ball retainer 138 is anchored so as to not move when motor drive shaft 113 or locking mechanism 136 move. The end of lock ball retainer 138 closest to motor drive shaft 113 may not be radially within locking mechanism 136 and may have at least one flange that extends radially outward to provide structural support and other functions. The diameter and thickness of lock ball retainer 138 is substantially consistent throughout the length of lock ball retainer 138 and is not tapered like locking mechanism 136. Lock ball retainer 138 includes a plurality of holes aligned circumferentially around lock ball retainer 138 at a point near the middle of lock ball retainer 138 when measured along the length of lock ball retainer 138.

Within the plurality of holes in lock ball retainer 138 are lock ball bearings 140, which are spherical and have a diameter that is greater than the thickness of lock ball retainer 138 so that lock ball bearings 140 protrude from either the inner surface or outer surface of lock ball retainer 138, depending on whether locking mechanism 136 is in the locked position (FIGS. 2A and 2D) or the unlocked position (FIGS. 2B and 2C). When lock ball bearings 140 are radially within the non-tapered portion of locking mechanism 136 and when motor drive shaft 113 is in the engaged position (as will be discussed below), lock ball bearings 140 are at least partially within engaged groove 144, as is shown in FIG. 2A.

Engaged groove 144 is an indentation aligned circumferentially around motor drive shaft 113 and, along with lock ball bearings 140, prevents axial movement of motor drive shaft 113. Engaged groove 144 is near the end of motor drive shaft 113 such that when lock ball bearings 140 are within engaged groove 144, motor drive shaft 113 and wave generator 128 are within harmonic drive 114. When lock ball bearings 140 are radially within the non-tapered portion of locking mechanism 136 (the inner surface of locking mechanism 136 is pushing on lock ball bearings 140) and when motor drive shaft 113 is in the disengaged position (as will be discussed below), lock ball bearings 140 are at least partially within disengaged groove 146, as is shown in FIG. 2D. Disengaged groove 146 is similar to engaged groove 144 but is closer to harmonic drive 114 such that when lock ball bearings 140 are within disengaged groove 144, motor drive shaft 113 and wave generator 128 are not within harmonic drive 114.

When lock ball bearings 140 are not being pushed into engaged groove 144 or disengaged groove 146 by the non-tapered portion of locking mechanism 136 (when lock ball bearings are radially within the tapered portion of locking mechanism 136), lock ball retainer 138 is configured to push (through the use of springs or other device) lock ball bearings 140 radially outward so that lock ball bearings are not within engaged groove 144 or disengaged groove 146. In this situation, motor drive shaft 113 and wave generator 128 are not prevented from moving axially by lock ball bearings 140 and are able to be removed from or inserted into harmonic drive 114. The various stages of drive assembly with selective disconnect 110 as motor drive shaft 113 is disengaged from harmonic drive 114 and output shaft 116 are described below.

FIG. 2A shows drive assembly with selective disconnect 110 in an engaged, locked position. At this point, motor drive shaft 113 and wave generator 128 are within harmonic drive 114, allowing energy to be transferred between harmonic drive 114 and output shaft 116. Additionally, solenoid 134 is in a non-retracted position so locking mechanism 136 is in a position closer to harmonic drive 114, meaning that the non-tapered portion of locking mechanism 136 is radially outward from lock ball bearings 140. In this situation, the inner surface of the non-tapered portion of locking mechanism 136 pushes on lock ball bearings 140, causing lock ball bearings 140 to be at least partially within engaged groove 144 and preventing motor drive shaft 113 from moving axially. This keeps motor drive shaft 113 and wave generator 128 in the engaged position within harmonic drive 114.

Drive assembly with selective disconnect 110 is in the engaged, locked position during normal working conditions, allowing output 116 to drive an actuator or other device. When in this position, solenoid 134 has not retracted locking mechanism 136, pushing lock ball bearings 140 into engaged groove 144. Motor drive shaft 113 is in a forward, engaged position and spring 142 is compressed and prevented from pushing motor drive shaft 113 away from harmonic drive 114 by lock ball bearings in engaged groove 144.

FIG. 2B shows drive assembly with selective disconnect 110 in an engaged, unlocked position. At this point, motor drive shaft 113 and wave generator 128 are within harmonic drive 114, allowing energy to be transferred between motor drive shaft 113 and output shaft 116 through harmonic drive 114. Solenoid 134 has retracted locking mechanism 136, putting locking mechanism 136 in a position further away from harmonic drive 114 than its position in FIG. 2A. Because locking mechanism 136 is retracted by solenoid 134, the tapered portion of locking mechanism 136 is radially outward from lock ball bearings 140. In this situation, the inner surface of the tapered portion of locking mechanism 136 is not pushing on lock ball bearings 140, allowing lock ball bearings 140 to move radially outward and not be at least partially within engaged groove 144. Because lock ball bearings 140 are not within engaged groove 144, motor drive shaft 113 is not axially locked in position.

Drive assembly with selective disconnect 110 is in the engaged, unlocked position for only a short period of time until spring 142 extends and pushes motor drive shaft 113 away from harmonic drive 114. Solenoid 134 will be instructed to retract locking mechanism 136 by a control system, such as controller 22, that is monitoring drive assembly with selective disconnect 110. When it is determined that output shaft 116 is malfunctioning so that the actuator or other device driven by output shaft 116 is not functioning properly, solenoid 134 will be instructed to retract locking mechanism 136 and begin the process of disengaging/decoupling motor drive shaft 113 and wave generator 128 from harmonic drive 114 (by removing wave generator 128 from being in contact with flex gear 130).

FIG. 2C shows drive assembly with selective disconnect 110 in a disengaged, unlocked position. At this point, motor drive shaft 113 and wave generator 128 are not within harmonic drive 114 so wave generator 128 is not in contact with flex gear 130, preventing energy from being transferred between motor drive shaft 113 and output shaft 116. Additionally, because motor drive shaft 113 and wave generator 128 are not within harmonic drive 114, a backup system activated to take over control of the actuator or other device attached to output shaft 116 does not have to overcome the resistance on output shaft 116 provided by output shaft 116 being coupled to motor drive shaft 113.

When drive assembly with selective disconnect 110 is in a disengaged, unlocked position, solenoid 134 and locking mechanism 136 are in a retracted position, as they were in FIG. 2B. Because locking mechanism 136 is retracted by solenoid 134, the tapered portion of locking mechanism 136 is radially outward from lock ball bearings 140. In this situation, the inner surface of the tapered portion of locking mechanism 136 is not pushing on lock ball bearings 140, allowing lock ball bearings 140 to be radially outward from motor drive shaft 113 and not be at least partially within engaged groove 144 or disengaged groove 146 (which would prevent motor drive shaft 113 from moving axially). While lock ball bearings 140 are not within disengaged groove 146 in FIG. 2C, lock ball bearings 140 are aligned in a position radially outward from disengaged groove 146. Lock ball bearings 140 are in this position because spring 142 has moved motor drive shaft 113 and caused disengaged groove 146 to move axially into alignment with lock ball bearings 140.

Drive assembly with selective disconnect 110 is in the disengaged, unlocked position for only a short period of time until solenoid 134 extends and moves locking mechanism 136 towards harmonic drive 114, which again locks motor drive shaft 113 in place as is shown in FIG. 2D. As mentioned above, when motor drive shaft 113 is in the disengaged position, energy is not transferred between motor drive shaft 113 and output shaft 116 through harmonic drive 114 and output shaft 116 is not restrained or locked in place by motor drive shaft 113 but rather is free to rotate.

FIG. 2D shows drive assembly with selective disconnect 110 in a disengaged, locked position. At this point, motor drive shaft 113 and wave generator 128 are not within harmonic drive 114 and are locked in place such that no axial movement is allowed. Motor drive shaft 113 is prevented from axial movement by lock ball bearings 140, which are at least partially within disengaged groove 146 because locking mechanism 136 has be moved by solenoid 134 toward harmonic drive 114, causing the non-tapered portion of locking mechanism 136 to be radially outward from lock ball bearings 140 and push lock ball bearings 140 into disengaged groove 146.

Drive assembly with selective disconnect 110 is in the disengaged, locked position when it is determined that output shaft 116 is malfunctioning so that the actuator or other device driven by output shaft 116 is not functioning properly. Output shaft 116 and/or the actuator or other device connected to output shaft 116 may not be functioning properly because it or another component has failed. As mentioned before, once drive assembly with selective disconnect 110 is in the disengaged, locked position, it will remain there until the system is fixed or has been determined to be working properly. When the system is determined to be working properly, reconnect sleeve 143 may then be activated to move motor drive shaft 113 and wave generator 128 back into harmonic drive 114 and reengage motor drive shaft 113 (after solenoid 134 has retracted locking mechanism 136 to unlock motor drive shaft 113 and allow for axial movement).

Reengaging/inserting motor drive shaft 113 and wave generator 128 into harmonic drive 114 so that wave generator 128 is radially within flex gear 130 requires wave generator 128 to come into contact with the smooth inner surface of flex gear 130. Because the location of axial movement within harmonic drive 114 is between the smooth outer surface of wave generator 128 and the smooth inner surface of flex gear 130, wave generator 128 does not have to be substantially aligned with flex gear 130, making reengagement easier than it would be with a conventional gear reduction that has teeth on these two surfaces and requires the teeth to be perfectly aligned.

Additionally, drive assembly with selective disconnect 110 is advantageous because it allows motor drive shaft 113 to be disengaged/decoupled from harmonic drive 114 and output shaft 116 so any backup system does not have to overcome the resistance that motor drive shaft 113 provides by being coupled to output shaft 116. Because motor drive shaft 113 is decoupled from output shaft 116, output shaft 116 does not become stuck or jammed in place, providing a safer and more easily fixed system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A harmonic drive assembly with selective disconnect comprising:
   a motor with a motor drive shaft;
   a harmonic drive operatively coupled to one end of the motor drive shaft;
   a wave generator of the harmonic drive operatively coupled to the motor drive shaft and a flex gear of the harmonic drive;
   a ring gear of the harmonic drive operatively coupled to the flex gear with a plurality of ring gear teeth configured to mesh with a plurality of flex gear teeth;
   an output shaft operatively coupled to the harmonic drive; and
   a retracting mechanism configured to selectively retract the motor drive shaft and the wave generator axially to decouple the motor drive shaft from the harmonic drive and to decouple the wave generator from the flex gear, wherein a clearance between the ring gear teeth and the flex gear teeth is established upon retraction of the motor drive shaft and the wave generator.

2. The harmonic drive assembly of claim 1, wherein the flex gear is configured to move between a deformed state and a free state, wherein the flex gear is in the free state when the wave generator is in a retracted condition.

3. The harmonic drive assembly of claim 2, wherein the flex gear teeth have a pitch diameter in the free state that is less than a pitch diameter of the ring gear teeth minus the sum of a flex gear tooth height in the free state and a tooth height of the ring gear.

4. The harmonic drive assembly of claim 1, wherein the output shaft is coupled to an actuator.

5. The harmonic drive assembly of claim 1, wherein the retracting mechanism selectively retracts the motor drive shaft axially in response to feedback from the output shaft or the electric motor.

6. The assembly of claim 1, wherein the retracting mechanism includes:
   a locking mechanism located at another end of the motor drive shaft, the locking mechanism having a first end and a second end, the first end located radially outside the motor drive shaft;
   a solenoid connected to the second end of the locking mechanism, the solenoid selectively retracts the locking mechanism axially to move the locking mechanism from a locked position to an unlocked position; and
   a spring attached to the motor drive shaft, the spring retracts the motor drive shaft when the solenoid moves the locking mechanism into an unlocked position.

7. The assembly of claim 6, wherein the solenoid selectively moves the locking mechanism axially from the unlocked position to the locked position.

8. The assembly of claim 6, wherein the radially inner surface of the locking mechanism is partially tapered to allow a plurality of ball bearings to move radially outward as the locking mechanism is retracted into the unlocked position and radially inward as the locking mechanism is moved into the locked position.

9. The assembly of claim 8, wherein the locking mechanism is in the locked position when the plurality of ball bearings is located in a groove radially around the motor drive shaft.

10. A method of disconnecting a harmonic drive assembly comprising:
    retracting a wave generator of a harmonic drive and a motor drive shaft out of a flex gear of the harmonic drive; and
    disengaging a plurality of flex gear teeth of the flex gear from a plurality of ring gear teeth of a ring gear of the harmonic drive, wherein disengaging the flex gear teeth and the ring gear teeth provides a clearance therebetween.

11. The method of claim 10, wherein the flex gear is moveable between a deformed state and a free state, wherein the flex gear is in the free state when the wave generator is in a retracted condition.

12. The method of claim 11, wherein the clearance between the flex gear teeth and the ring gear teeth is established by sizing the flex gear teeth to have a pitch diameter in the free state that is less than a pitch diameter of the ring gear teeth minus the sum of a flex gear tooth height in the free state and a tooth height of the ring gear.

* * * * *